Patented July 11, 1933

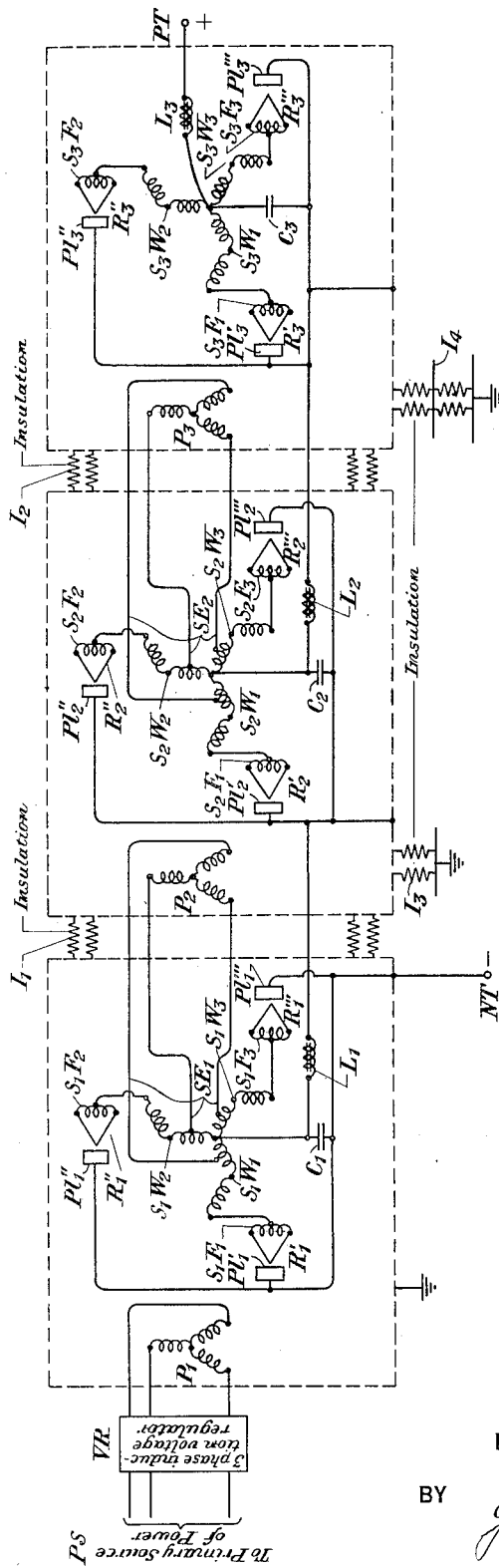

1,917,453

UNITED STATES PATENT OFFICE

DE LOSS K. MARTIN, OF WEST ORANGE, NEW JERSEY, ASSIGNOR TO AMERICAN TELEPHONE & TELEGRAPH COMPANY, A CORPORATION OF NEW YORK

SYSTEM FOR PRODUCING HIGH VOLTAGE DIRECT CURRENTS

Original application filed September 25, 1925, Serial No. 58,662. Divided and this application filed June 1, 1929. Serial No. 367,811.

This is a division of a copending application filed September 25, 1925, Serial No. 58,662.

This invention relates to systems for producing high voltage direct current, and particularly to systems in which a plurality of transformers and rectifiers are employed for obtaining such high voltage direct current from low voltage alternating current.

In former arrangements of such systems, it was possible to obtain high voltage current by connecting the primaries of each of a plurality of transformers in parallel with a primary or exciting source of current, the secondaries of said transformers being connected in series relationship with each other in a separate circuit. When the currents in the transformers were in phase, the potential produced was several times the potential produced by any one of the transformers, the potential depending upon the number of transformers so connected. But in such arrangements, each of the transformers in turn had to be insulated for increasing potentials, the last transformer being insulated for the full potential produced in the arrangement.

It is an object of the present invention to provide a high voltage direct current system in which the voltage for which the entire arrangement is insulated is considerably greater than the voltage for which any one of the transformers employed therein need be insulated.

It is a further object of this invention to so arrange a plurality of transformers and rectifiers with respect to a primary source of low voltage alternating current that high voltage direct current will be easily obtainable.

And it is a further object of the invention to employ a plurality of selective devices along with a plurality of transformers and rectifiers so that the high voltage direct current obtainable will be substantially free from any alternating current waves.

A good understanding of the invention may be had from the detailed description hereinafter following, reference being had to the accompanying drawing which represents a system for obtaining high voltage direct current from a primary source of three-phase alternating current.

In the drawing there is illustrated an arrangement for obtaining high voltage rectified current from a three-phase alternating current source of power. Three groups are illustrated connected in cascade, each comprising a transformer, rectifiers and a selective device. The primary $P_1$ in group 1 is connected to the primary source of power PS through a three-phase inductive voltage regulator VR. The secondary $S_1$ is arranged in an inter-connected star combination in order to balance out the magnetic field of the direct current in said secondary. An auto transformer is tapped out from the three windings of the secondary $S_1W_1$, $S_1W_2$ and $S_1W_3$, this auto transformer being employed as a means for exciting the primary $P_2$ of the transformer $T_2$ in group 2. The secondary windings $S_1F_1$, $S_1F_2$ and $S_1F_3$, each connected to a filament in rectifiers $R'_1$, $R''_1$ and $R'''_1$, are placed adjacent to the high potential end of the secondary $S_1$, the midpoints of said windings being connected to the high potential ends of windings $S_1W_1$, $S_1W_2$ and $S_1W_3$, respectively. It will be understood that the primary $P_1$, windings $S_1W_1$, $S_1W_2$, $S_1W_3$, and windings $S_1F_1$, $S_1F_2$ and $S_1F_3$ are all wound on a common core.

The condenser $C_1$ and inductance $L_1$ form an element of a filter in group 1. It will be understood that a plurality of such elements may be employed for rendering the direct current as free of alternating current waves as may be found desirable. Similar arrangements are provided for groups 2 and 3.

The circuit for the direct current throughout the system may be traced as follows: From the negative terminal NT of group 1 to the plates $PL'_1$, $PL''_1$ and $PL'''_1$ of the rectifier tubes $R'_1$, $R''_1$, $R'''_1$, respectively, then through the tubes to the windings $S_1F_1$, $S_1F_2$ and $S_1F_3$ to the high potential ends of windings $S_1W_1$, $S_1W_2$ and $S_1W_3$, respectively, and then through said latter windings to the midpoint of $S_1$. The rectified current then flows through the inductance $L_1$ to the plates $PL'_2$, $PL''_2$ and $PL'''_2$ of the rectifiers $R'_2$, $R''_2$ and $R'''_2$, respectively, then flows through the tubes to the windings $S_2W_1$, $S_2W_2$ and $S_2W_3$ to the apex of the secondary $S_2$. The current then flows through the inductance $L_2$ to the plates $PL'_3$, $PL''_3$, $PL'''_3$ in group 3. The path of the current is then traced through the rectifiers and windings $S_3W_1$, $S_3W_2$ and $S_3W_3$ to the apex of the secondary $S_3$, then through inductance $L_3$ to the high potential positive terminal PT.

In group 1, the condenser $C_1$ is connected between the plates $PL'_1$, $PL''_1$ and $PL'''_1$ and the midpoint of the secondary, which is at a higher potential. The inductance $L_1$ is connected between the midpoint of the secondary $S_1$ and the plates $PL'_2$, $PL''_2$ and $PL'''_2$ in group 2. The condensers and inductances are similarly connected in the groups 2 and 3.

In the system disclosed in the drawing, group 1 is at the ground potential and group 2 is insulated from group 1 by means of insulation $I_1$, and is also insulated from ground by means of insulation $I_3$ for a potential equal to that developed in group 1. Group 3 is insulated from group 2 by means of insulation $I_2$ for a potential developed in group 2 and is further insulated from ground by means of insulation $I_4$ for twice the potential developed in group 1. The direct current obtainable in such an arrangement will have a potential which is three times that developed in a single group.

Similar arangements may be employed for obtaining high voltage direct current for the operation of radio transmitting sets and for power transmission systems employing high voltage direct current. It will be understood that while only three units have been illustrated in the drawing, any number of units may be similarly connected to obtain any desired direct current potential.

While only certain particular embodiments of the invention have been disclosed which are deemed desirable, it will be understood that it is capable of embodiment in other and widely varied organizations without departing from the spirit of the invention as defined in the appended claims.

What is claimed is:

1. A system for transforming three-phase alternating current of low voltage into direct current of high voltage, comprising a low voltage source of three-phase alternating current, a plurality of transformers connected in cascade with respect to said source, each transformer having three-phase primary windings and six-phase secondary windings, the secondary windings of each transformer being connected in series in pairs to produce composite three-phase secondary windings, each transformer being capable of increasing the voltage of the three-phase alternating current impressed thereon, said transformers being employed for increasing the voltage of the system to any desired level, a plurality of rectifiers each associated with a corresponding transformer, each rectifier being capable of transforming the higher voltage three-phase alternating current derived from the corresponding transformer into direct current, and means to additively combine the voltage effects derived from said rectifiers.

2. A system for transforming three-phase alternating current of low voltage into direct current of high voltage, comprising a plurality of transformers connected in cascade for successively increasing the potential of the impressed current to any desired value, the primary windings of each transformer after the first transformer being connected to taps on the secondary windings of each preceding transformer, said taps being so placed that the primary windings of all transformers will receive voltages in the same phase, a plurality of rectifiers capable of rectifying the three-phase alternating currents derived from said transformers, each rectifier being associated with a corresponding transformer for rectifying a large portion of the current in the secondary of that transformer, the various rectifiers being arranged so that their output voltages are additively combined, and a filter, said filter being employed for rendering the direct current output substantially independent of alternating current waves.

3. A system for transforming three-phase alternating current of low voltage to direct current of high voltage, comprising a plurality of transformers each capable of passing impressed three-phase alternating current, said transformers being employed for successively increasing the potential of the impressed current to any desired value, each transformer having three-phase primary windings and six-phase secondary windings, the secondary windings of each transformer being connected in series in pairs to produce composite three-phase secondary windings, the primary windings of each transformer after the first transformer being connected to taps on the secondary windings of each preceding transformer, said taps being so placed that the primary windings of all transformers will receive voltages in the same phase, and vacuum tube rectifying means associated with each transformer for rectifying the three-phase current in the secondary of each transformer, the potential of the rectified current being as many times the potential produced by one of said transformers as there are transformers employed in the system, the windings of each transformer being insulated from each other and from the core on which they are wound for the potential developed in said transformer, the terminals of the high voltage direct current being insulated from each other for a potential which is as many times the potential for which the windings of a single transformer are insulated as there are transformers in the system.

In testimony whereof, I have signed my name to this specification this 29th day of May 1929.

DE LOSS K. MARTIN.